US010720678B2

(12) United States Patent
Kim et al.

(10) Patent No.: US 10,720,678 B2
(45) Date of Patent: Jul. 21, 2020

(54) INDIRECT COOLING SYSTEM CAPABLE OF UNIFORMLY COOLING BATTERY MODULES AND BATTERY PACK INCLUDING THE SAME

(71) Applicant: LG CHEM, LTD., Seoul (KR)

(72) Inventors: Hyo Chan Kim, Daejeon (KR); Gwan Woo Kim, Daejeon (KR); Jin Kyu Lee, Daejeon (KR); Sang Wook Yim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 147 days.

(21) Appl. No.: 15/753,084

(22) PCT Filed: Dec. 2, 2016

(86) PCT No.: PCT/KR2016/014085
§ 371 (c)(1),
(2) Date: Feb. 15, 2018

(87) PCT Pub. No.: WO2017/095172
PCT Pub. Date: Jun. 8, 2017

(65) Prior Publication Data
US 2018/0241102 A1 Aug. 23, 2018

(30) Foreign Application Priority Data
Dec. 4, 2015 (KR) .................. 10-2015-0172265

(51) Int. Cl.
*H01M 10/613* (2014.01)
*H01M 10/6568* (2014.01)
(Continued)

(52) U.S. Cl.
CPC ........... *H01M 10/613* (2015.04); *H01M 2/10* (2013.01); *H01M 10/6554* (2015.04);
(Continued)

(58) Field of Classification Search
CPC ......... H01M 10/60–61; H01M 10/613; H01M 10/615; H01M 10/617; H01M 10/625; H01M 6/50; H01M 6/5038
(Continued)

(56) References Cited

U.S. PATENT DOCUMENTS 8,808,937 B2 8/2014 Takemoto et al.
9,711,808 B2 7/2017 Lienkamp et al.
(Continued)

FOREIGN PATENT DOCUMENTS

CN 101546841 A 9/2009
CN 102137771 A 7/2011
(Continued)

OTHER PUBLICATIONS

International Search Report for PCT/KR2016/014085 (PCT/ISA/210) dated Mar. 3, 2017.
(Continued)

*Primary Examiner* — Bach T Dinh
(74) *Attorney, Agent, or Firm* — Birch, Stewart, Kolasch & Birch, LLP

(57) ABSTRACT

Disclosed herein are a cooling system and a battery pack including the same. The cooling system includes a refrigerant introduction port, through which liquid refrigerant is introduced, a refrigerant discharge port, through which the liquid refrigerant is discharged, a plurality of refrigerant pipes configured to communicate with the refrigerant introduction port or the refrigerant discharge port, one or more pipe connection members configured to interconnect two or more of the refrigerant pipes such that the refrigerant pipes communicate with each other, the pipe connection members being configured to divide the liquid refrigerant or to change the flow direction of the liquid refrigerant between the connected refrigerant pipes, and a plurality of cooling plates,
(Continued)

each of which has a hollow flow channel communicating with at least one of the refrigerant pipes and each of which has one surface on which a corresponding one of the battery modules is mounted, the liquid refrigerant being circulated along the hollow flow channel.

20 Claims, 11 Drawing Sheets

(51) Int. Cl.
  *H01M 10/6554* (2014.01)
  *H01M 2/10* (2006.01)
(52) U.S. Cl.
  CPC .... *H01M 10/6568* (2015.04); *H01M 2220/20* (2013.01); *Y02T 10/6269* (2013.01)
(58) Field of Classification Search
  USPC .......................................... 429/433–442, 62
  See application file for complete search history.

(56) References Cited

U.S. PATENT DOCUMENTS

| | | | |
|---|---|---|---|
| 10,547,093 | B2 | 1/2020 | Kim et al. |
| 2012/0312610 | A1 | 12/2012 | Kim et al. |
| 2013/0014923 | A1* | 1/2013 | Girmscheid ........ H01M 10/625 165/168 |
| 2013/0207459 | A1 | 8/2013 | Schröder et al. |
| 2013/0295422 | A1 | 11/2013 | Kim et al. |
| 2014/0295223 | A1* | 10/2014 | Gendlin ............ H01M 10/0404 429/62 |
| 2015/0082821 | A1* | 3/2015 | Ganz ...................... F25B 1/005 62/259.1 |
| 2015/0118538 | A1 | 4/2015 | Haussmann |
| 2016/0036102 | A1* | 2/2016 | Suzuki ............. H01M 10/6567 429/120 |
| 2016/0087319 | A1 | 3/2016 | Roh et al. |
| 2016/0372805 | A1 | 12/2016 | Kim et al. |

FOREIGN PATENT DOCUMENTS

| | | |
|---|---|---|
| CN | 102815023 A | 12/2012 |
| EP | 2637248 A1 | 9/2013 |
| JP | 2009-252646 A | 10/2009 |
| JP | 2013-187159 A | 9/2013 |
| JP | 2014-507760 A | 3/2014 |
| JP | 2015-96416 A | 5/2015 |
| KR | 10-2012-0096133 A | 8/2012 |
| KR | 10-2012-0136923 A | 12/2012 |
| KR | 10-2013-0064969 A | 6/2013 |
| KR | 10-2013-0113740 A | 10/2013 |
| KR | 10-1367210 B1 | 2/2014 |
| KR | 10-2014-0037351 A | 3/2014 |
| KR | 10-2014-0062603 A | 5/2014 |
| KR | 10-2014-0109982 A | 9/2014 |
| KR | 10-2014-0143854 A | 12/2014 |
| KR | 10-2015-0100365 A | 9/2015 |
| WO | WO 2014/077578 A1 | 5/2014 |
| WO | WO 2015/130056 A1 | 9/2015 |

OTHER PUBLICATIONS

European Search Report for Appl. No. 16871068.9 dated Jun. 13, 2018.

* cited by examiner

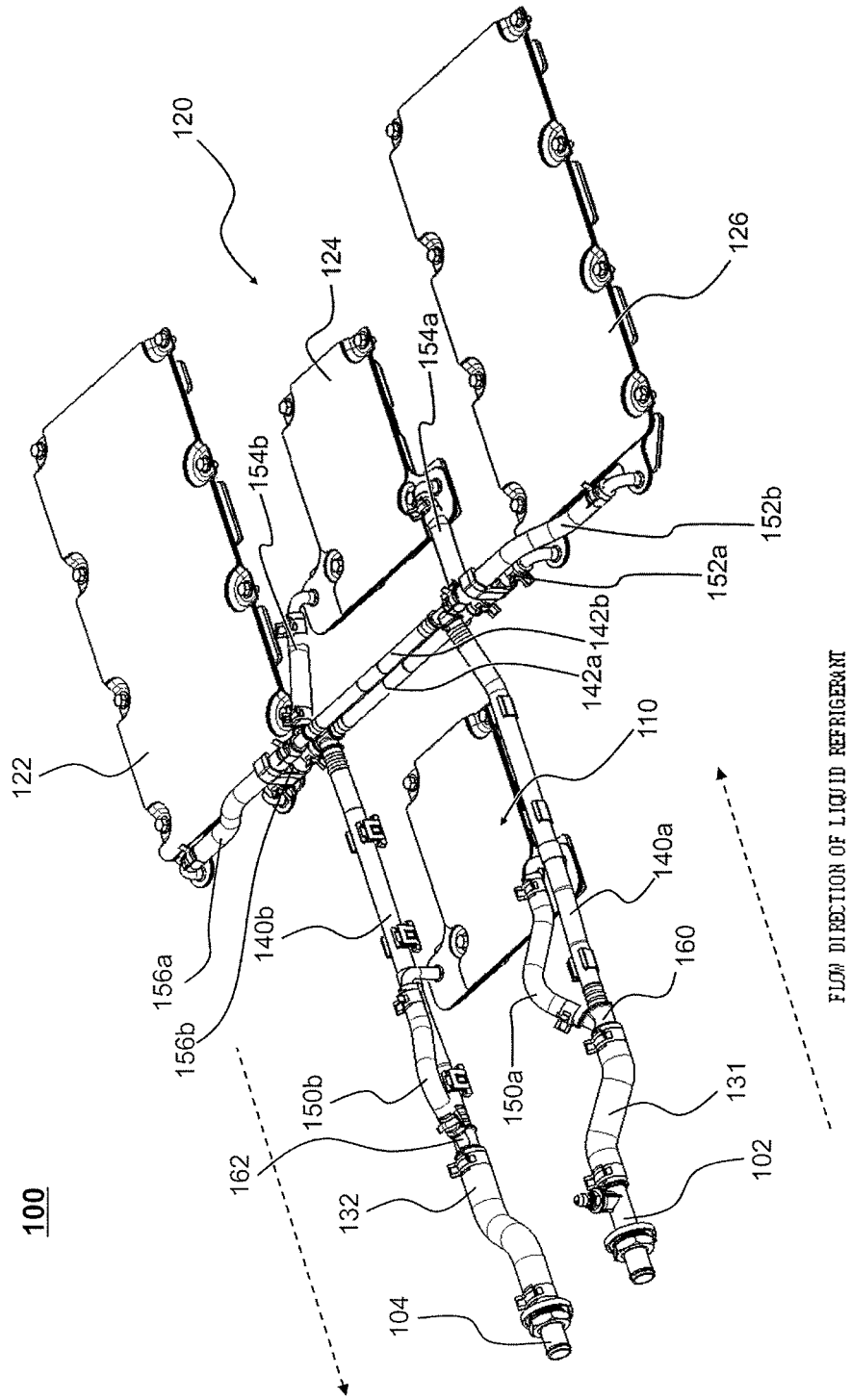
[FIG. 1]

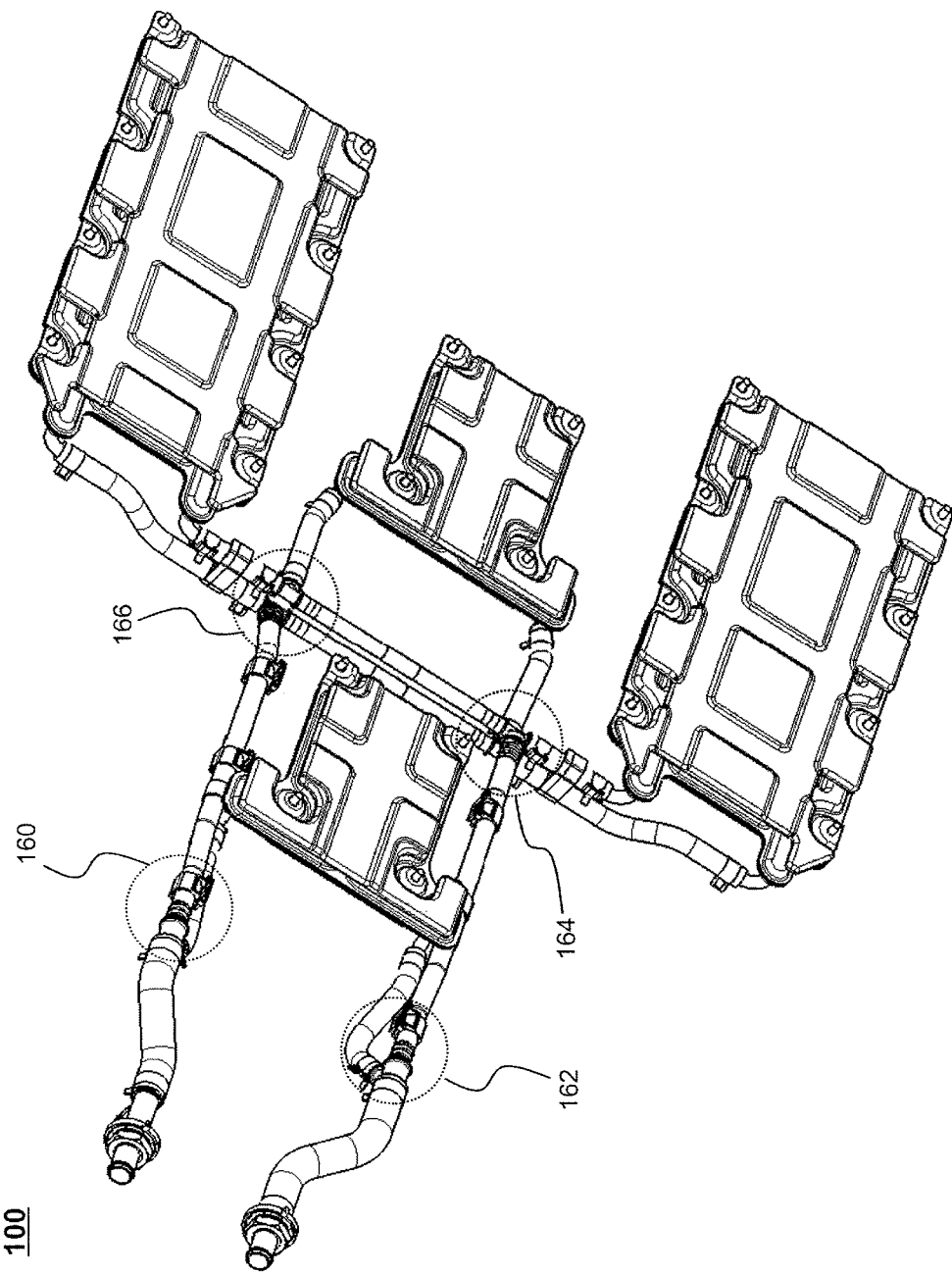
[FIG. 2]

[FIG. 3]
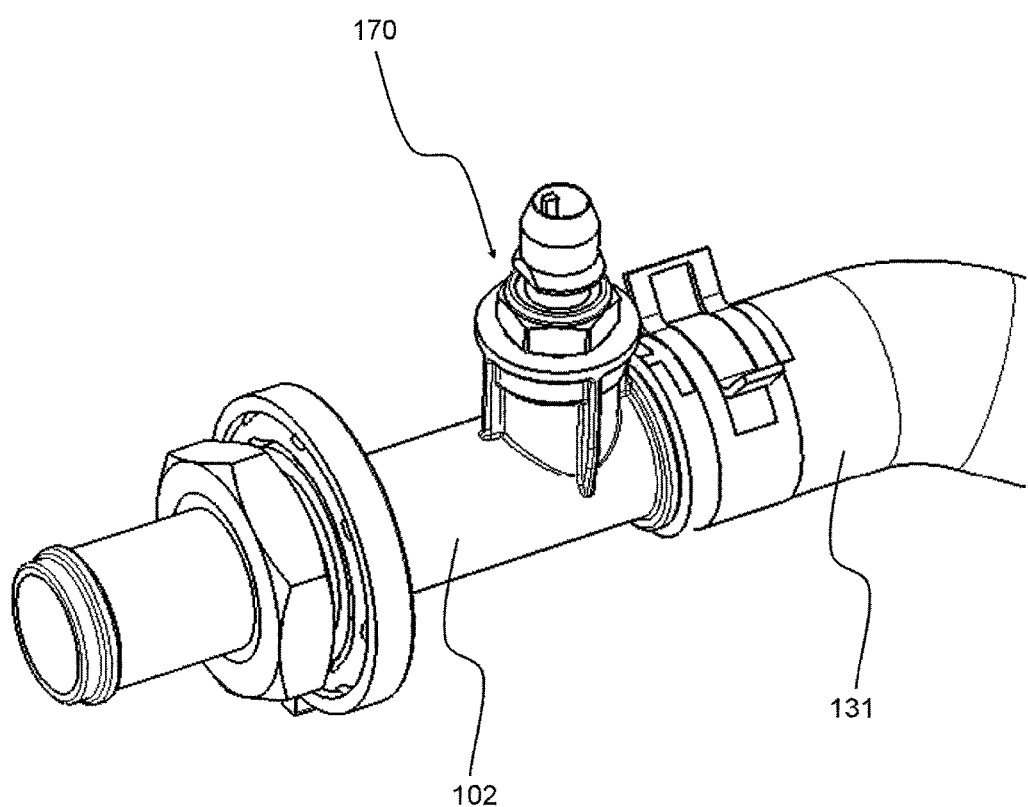

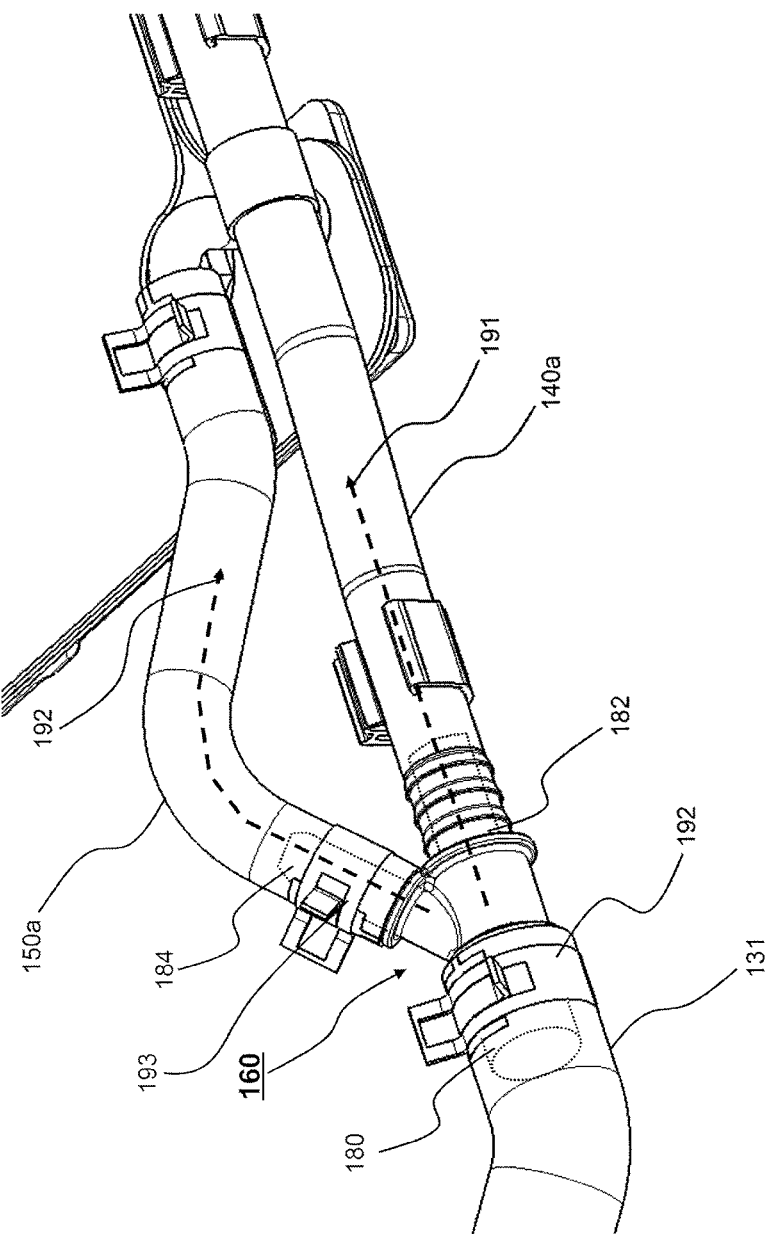
[FIG. 4]

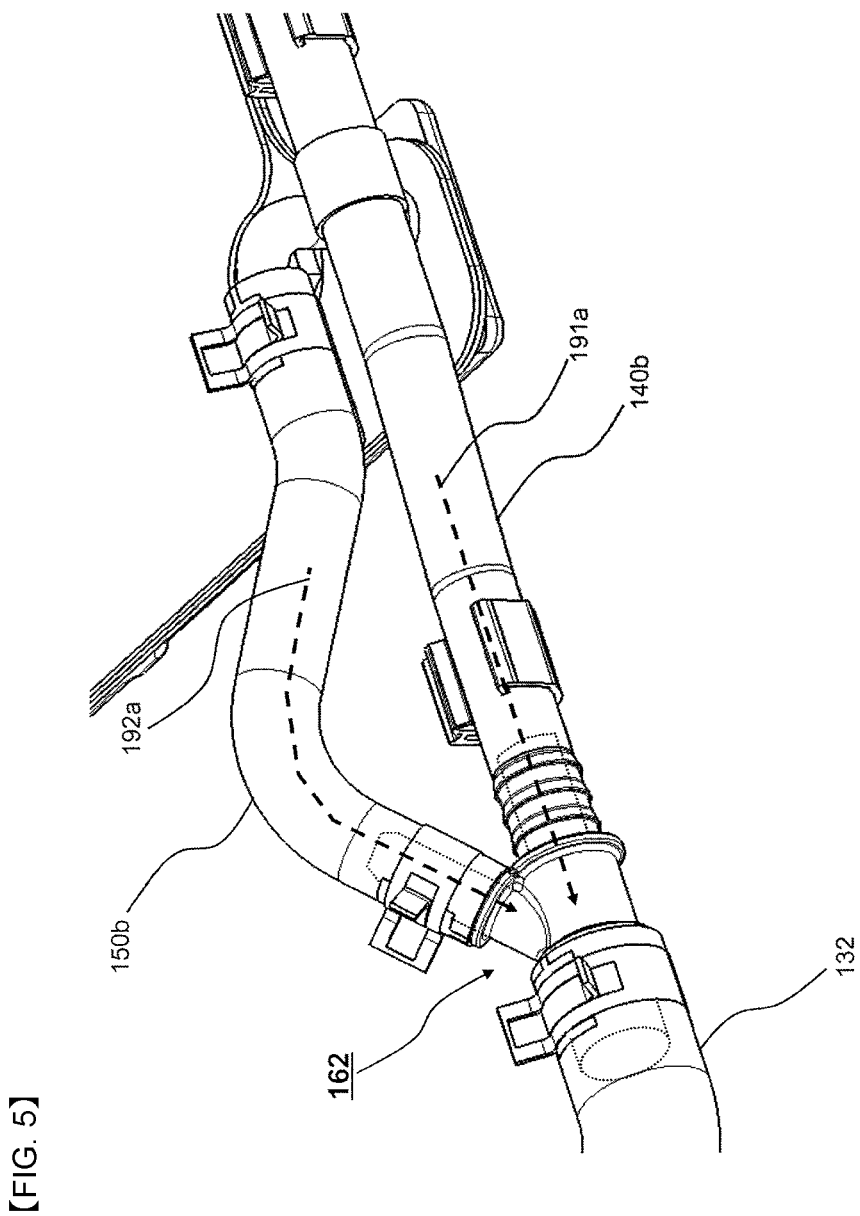
[FIG. 5]

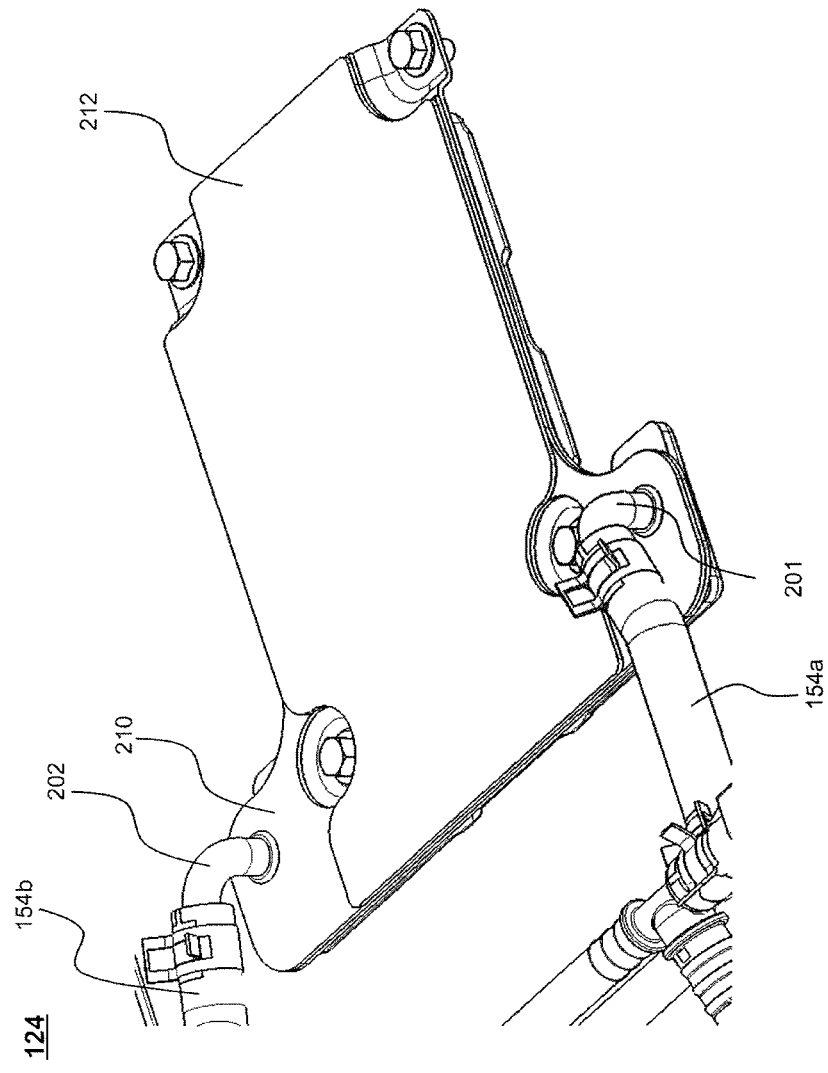
[FIG. 6]

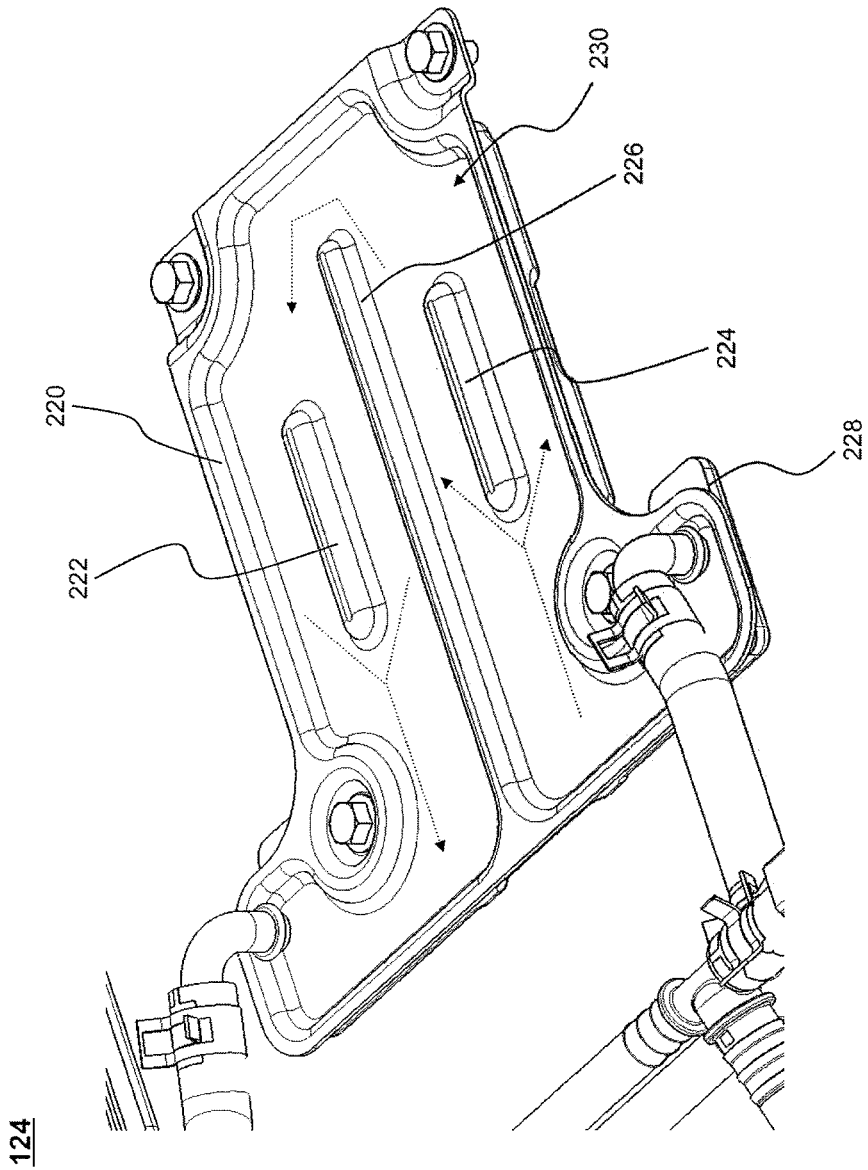
[FIG. 7]

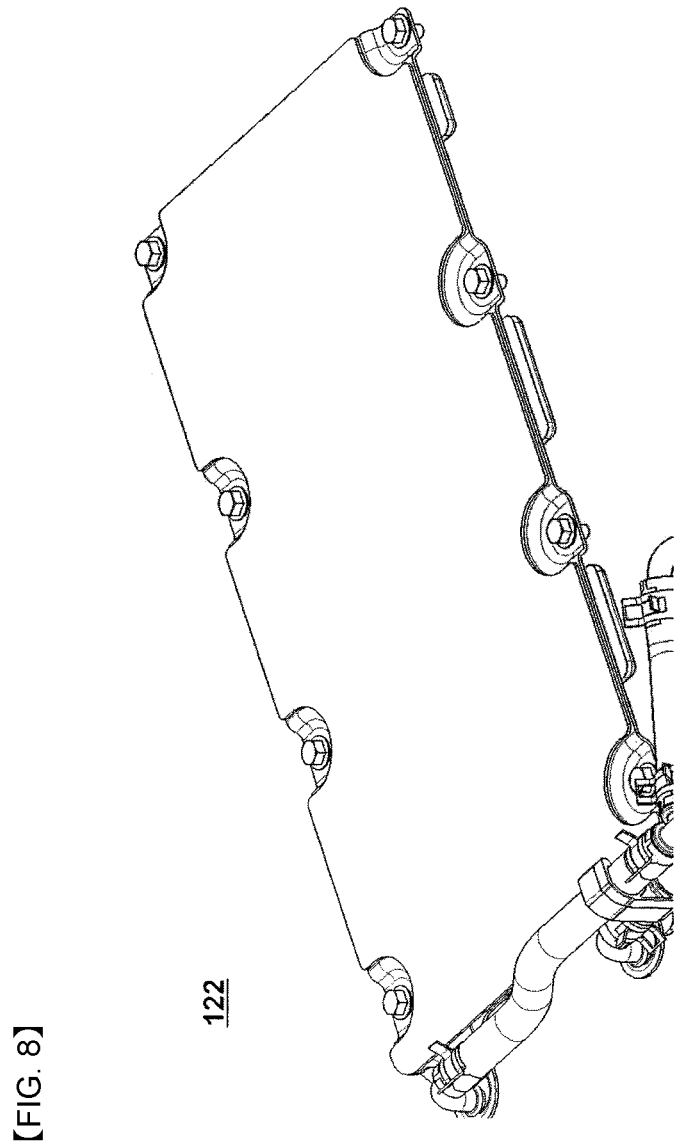
[FIG. 8]

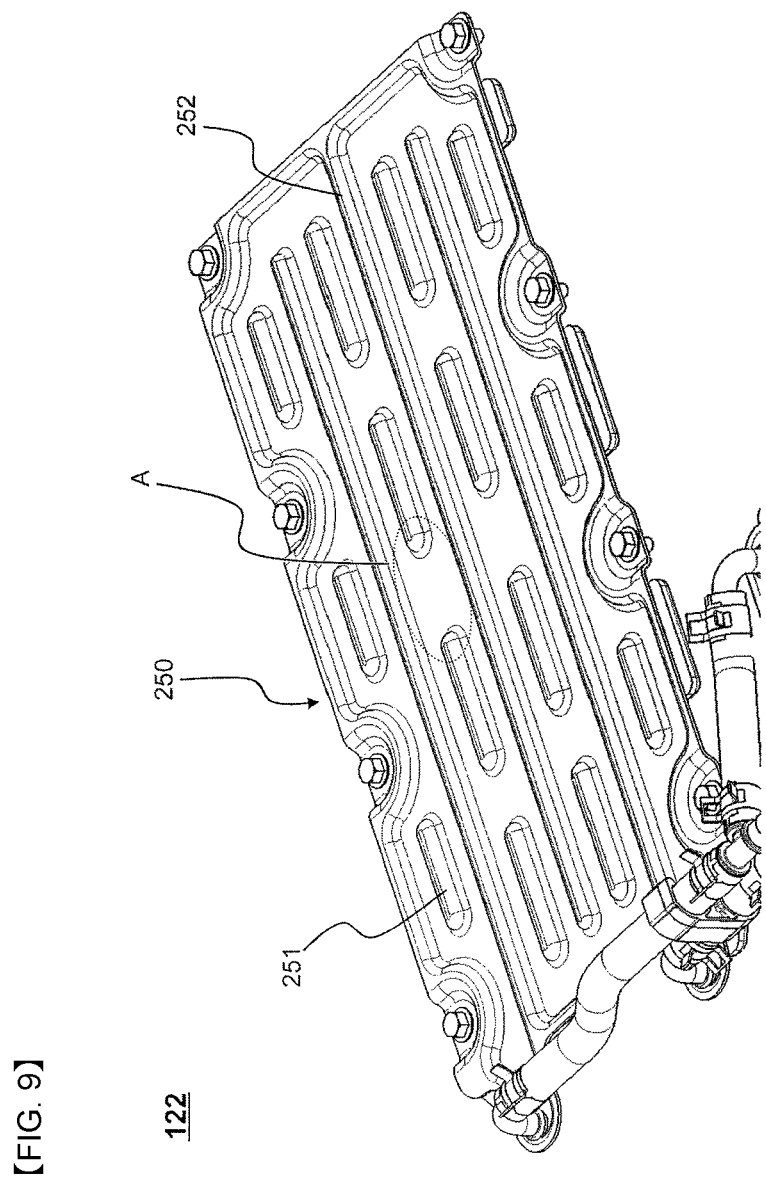
[FIG. 9]

[FIG. 10]
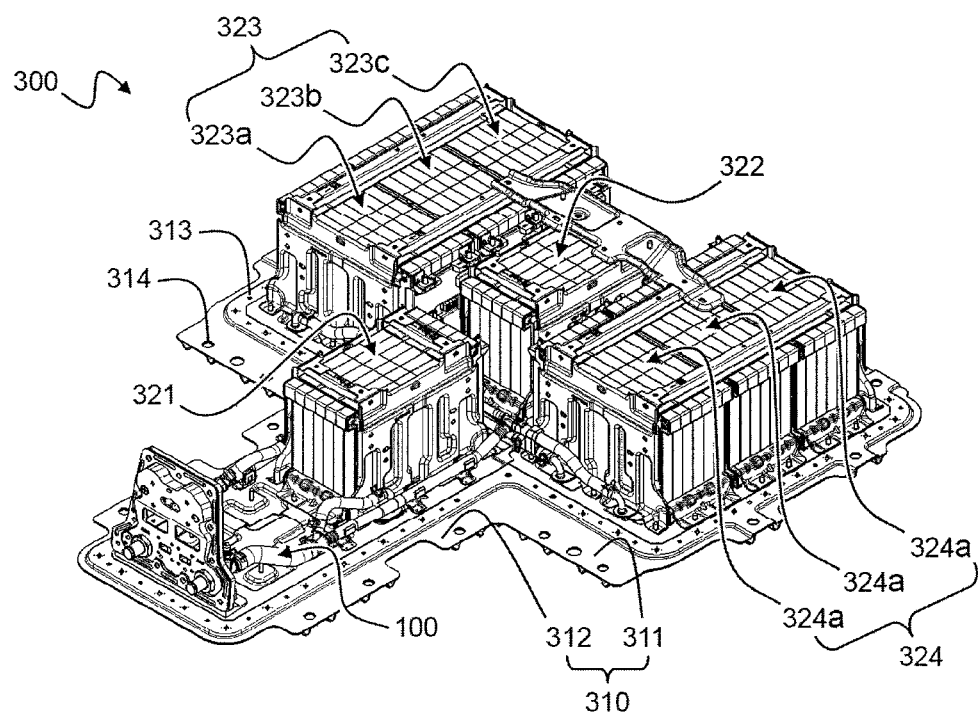

【FIG. 11】
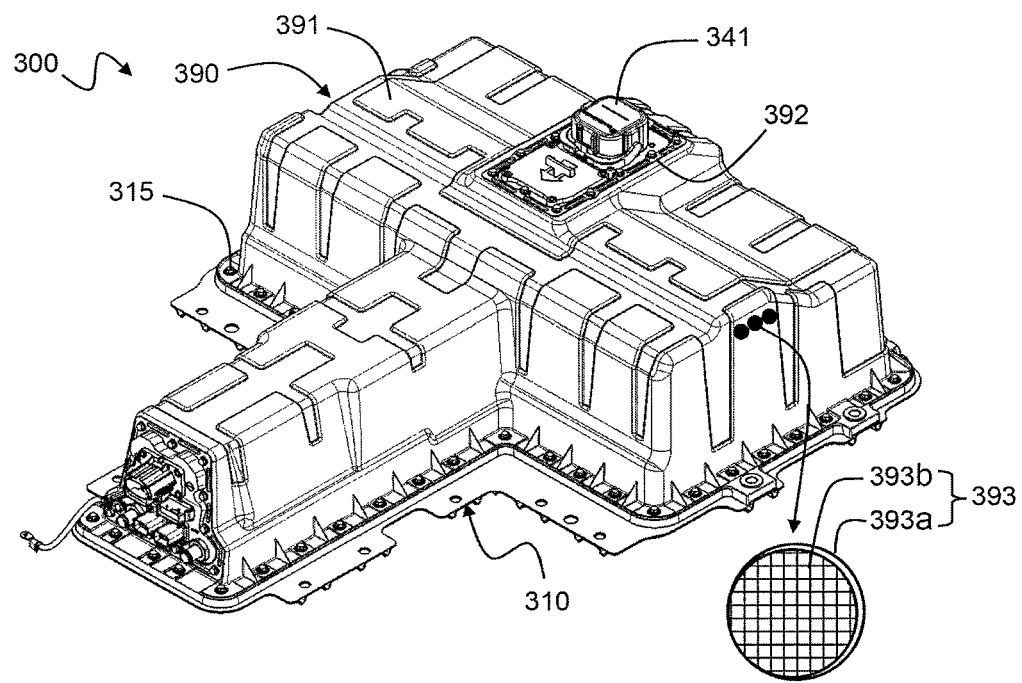

INDIRECT COOLING SYSTEM CAPABLE OF UNIFORMLY COOLING BATTERY MODULES AND BATTERY PACK INCLUDING THE SAME

TECHNICAL FIELD

This application claims the benefit of Korean Patent Application No. 10-2015-0172265 filed on Dec. 4, 2015 with the Korean Intellectual Property Office, the disclosure of which is herein incorporated by reference in its entirety.

The present invention relates to an indirect cooling system capable of uniformly cooling battery modules and a battery pack including the same.

BACKGROUND

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles that use fossil fuels.

Small-sized mobile devices use one or a few battery cells for each device. On the other hand, middle or large-sized devices, such as vehicles, use a battery module including a plurality of modularized battery cells or a battery pack including a plurality of battery modules electrically connected to each other, because high output and large capacity are necessary for such middle or large-sized devices.

Preferably, a middle or large-sized battery module or a middle or large-sized battery pack is manufactured so as to have as small a size and weight as possible. For this reason, a prismatic battery or a pouch-shaped battery, which can be stacked with high integration and has a small weight to capacity ratio, is usually used as a battery cell (i.e. a unit cell) of the middle or large-sized battery module or the middle or large-sized battery pack. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

Battery cells constituting the middle or large-sized battery module or the middle or large-sized battery pack are secondary batteries that can be charged and discharged. Consequently, a large amount of heat is generated from the high-output, large-capacity secondary batteries during the charge and discharge of the secondary batteries. In particular, the laminate sheet of a pouch-shaped battery cell has a polymer material exhibiting low thermal conductivity coated on the surface thereof, with the result that it is difficult to effectively lower the overall temperature of the battery cell.

If heat, generated from the battery cells during the charge and discharge of the battery cells, is not effectively removed from the battery cells, the heat accumulates in the battery cells, with the result that deterioration of the battery cells is accelerated. According to circumstances, the battery cells may even catch fire or explode. For this reason, a high-output, large-capacity battery module or a high-output, large-capacity battery pack needs a cooling system for cooling battery cells mounted in the battery module or the battery pack.

Meanwhile, at least one battery module mounted in a middle or large-sized battery pack is generally manufactured by stacking a plurality of battery cells with high integration. In this case, the battery cells are stacked in the state in which the battery cells are arranged at predetermined intervals such that heat, generated from the battery cells during the charge and discharge of the battery cells, is removed. For example, the battery cells may be sequentially stacked in the state in which the battery cells are arranged at predetermined intervals without using an additional member. Alternatively, in the case in which the battery cells have low mechanical strength, one or more battery cells may be mounted in a cartridge, and a plurality of cartridges may be stacked to constitute a battery module. In the above structure, refrigerant flow channels may be defined between the stacked battery cells or between the stacked battery modules such that heat accumulating between the stacked battery cells or between the stacked battery modules is effectively removed.

In the battery pack cooling structure described above, however, a plurality of refrigerant flow channels must be provided so as to correspond to a plurality of battery cells or battery modules, with the result that the overall size of the battery pack is increased.

In addition, if the battery pack includes a larger number of battery cells, a larger number of parts are added to the cooling structure, with the result that the volume of the battery pack is increased, the manufacturing process is complicated, and cost incurred to design the cooling structure is greatly increased.

Furthermore, a plurality of parts is used to constitute a structure in which heat from the battery modules or the battery cells is transferred to the refrigerant flow channels, by which the heat is removed, with the result that thermal conductivity is lowered and thus cooling efficiency is reduced.

Therefore, there is a high necessity for a cooling system that can be designed so as to have a compact structure while exhibiting high cooling efficiency.

Technical Problem

The present invention has been made to solve the above problems and other technical problems that have yet to be resolved.

Specifically, it is an object of the present invention to provide a cooling system having a compact structure that is capable of uniformly removing heat generated from battery modules without using a large number of members.

It is another object of the present invention to provide a battery pack configured to be installed in a device, such as a vehicle, without positional limitations.

Technical Solution

In accordance with one aspect of the present invention, the above and other objects can be accomplished by the provision of a cooling system for cooling a plurality of battery modules, the cooling system including a refrigerant introduction port, through which liquid refrigerant is introduced, a refrigerant discharge port, through which the liquid refrigerant is discharged, a plurality of refrigerant pipes configured to communicate with the refrigerant introduction port or the refrigerant discharge port, one or more pipe connection members configured to interconnect two or more of the refrigerant pipes such that the refrigerant pipes communicate with each other, the pipe connection members being configured to divide the liquid refrigerant or to change the flow direction of the liquid refrigerant between the connected refrigerant pipes, and a plurality of cooling plates, each of which has a hollow flow channel communicating with at least one of the refrigerant pipes and each of which has one surface on which a corresponding one of the battery modules is mounted, the liquid refrigerant being circulated along the hollow flow channel, wherein the liquid refrigerant is divided by the pipe connection members, the divided streams of liquid refrigerant are supplied to the respective cooling plates, and the divided streams of liquid refrigerant are combined after being discharged from the respective cooling plates, whereby the battery modules are cooled by the respective cooling plates as the result of thermal conduction of the divided streams of liquid refrigerant.

That is, in the cooling system according to the present invention, the coolant flow channels are defined in the cooling plates, on which the battery modules are mounted. Compared to the structure in which the coolant flow channels are defined between the battery modules or between the battery cells, therefore, the cooling system according to the present invention has a compact structure. In addition, the divided streams of liquid refrigerant are introduced into the respective cooling plates to independently cool the battery modules mounted on the respective cooling plates, thereby achieving high uniformity of cooling of the battery modules.

Particularly, in the cooling system according to the present invention, the liquid refrigerant is supplied to the respective cooling plates in the state in which the temperature of the liquid refrigerant is almost uniform as the result of systematic coupling among the refrigerant pipes. Hereinafter, the structure of the cooling system according to the present invention will be described in detail through the following non-limiting examples.

In a concrete example, the refrigerant pipes may include a first refrigerant pipe connected to the refrigerant introduction port, a second refrigerant pipe connected to the refrigerant discharge port, a plurality of third refrigerant pipes disposed between the first refrigerant pipe and the second refrigerant pipe in the state of being connected to the respective pipe connection members such that the third refrigerant pipes communicate with the first refrigerant pipe and the second refrigerant pipe, and a plurality of fourth refrigerant pipes connected to the third refrigerant pipes via the pipe connection members, the fourth refrigerant pipes also being connected to the flow channels of the respective cooling plates.

More specifically, in the present invention, the third refrigerant pipes may be connected to the pipe connection members in order to guide the overall circulation of the liquid refrigerant. In addition, some of the third refrigerant pipes may be connected to the first refrigerant pipe and the second refrigerant pipe, with the result that the refrigerant introduction port and the refrigerant discharge port may communicate with the third refrigerant pipes.

Consequently, the liquid refrigerant may flow from the refrigerant introduction port to the first refrigerant pipe, and may then be circulated along the third refrigerant pipes. Subsequently, the liquid refrigerant may be discharged through the refrigerant discharge port via the second refrigerant pipe.

The fourth refrigerant pipes are pipes disposed between the third refrigerant pipes, along which the liquid refrigerant is circulated, and the cooling plates for interconnecting the third refrigerant pipes and the cooling plates. The fourth refrigerant pipes may guide the liquid refrigerant from the third refrigerant pipes to the cooling plates, or may guide the liquid refrigerant from the cooling plates to the third refrigerant pipes.

The first refrigerant pipe and the second refrigerant pipe may each have an inner diameter greater than the inner diameter of each of the other refrigerant pipes such that a large amount of liquid refrigerant can be introduced into the first refrigerant pipe and a large amount of liquid refrigerant can be discharged from the second refrigerant pipe and such that the liquid refrigerant can be pressurized and accelerated when the liquid refrigerant flows from a refrigerant pipe having a larger inner diameter to a refrigerant pipe having a smaller inner diameter. Specifically, the first refrigerant pipe and the second refrigerant pipe may each have an inner diameter equivalent to 101% to 200% of the inner diameter of each of the third refrigerant pipes.

If the first refrigerant pipe and the second refrigerant pipe each have an inner diameter less than 101% of the inner diameter of each of the third refrigerant pipes, the amount of liquid refrigerant that is introduced and discharged is too small to be smoothly circulated in the cooling system, and the liquid refrigerant is not sufficiently pressurized or accelerated, which is not desirable.

If the first refrigerant pipe and the second refrigerant pipe each have an inner diameter greater than 200% of the inner diameter of each of the third refrigerant pipes, on the other hand, the overall size of the cooling system is increased, and the mobility of the liquid refrigerant in the pipe connection members connected to the third refrigerant pipes is reduced due to excessive fluid pressure, which is also not desirable.

Meanwhile, at least one of the pipe connection members may be connected to at least one of the third refrigerant pipes and at least one of the fourth refrigerant pipes such that the liquid refrigerant is divided and distributed into the at least one of the third refrigerant pipes and the at least one of the fourth refrigerant pipes, thereby adjusting the flow direction of the liquid refrigerant.

That is, some of the liquid refrigerant may flow into a fourth refrigerant pipe through a pipe connection member, and the remainder of the liquid refrigerant may flow along a third refrigerant pipe.

Subsequently, the remainder of the liquid refrigerant may be divided and distributed into another fourth refrigerant pipe and another third refrigerant pipe through another pipe connection member.

Alternatively, at least one of the pipe connection members may be connected to at least one of the third refrigerant pipes and at least one of the fourth refrigerant pipes such that liquid refrigerant divided and distributed into the at least one of the third refrigerant pipes and the at least one of the fourth refrigerant pipes is combined into a single body of liquid refrigerant, thereby adjusting the flow rate of the liquid refrigerant.

Specifically, the liquid refrigerant is circulated along the flow channels defined in the cooling plates, flows into the fourth refrigerant pipes, and reaches the pipe connection members. Since the third refrigerant pipes are connected to the pipe connection members, the liquid refrigerant flowing in the fourth refrigerant pipes is combined with the liquid refrigerant flowing in the third refrigerant pipes in the pipe connection members.

Each of the pipe connection members may include a plurality of connection conduits connected to the refrigerant pipes in order to adjust the flow direction of the liquid refrigerant and to combine the divided streams of liquid refrigerant.

Specifically, each of the pipe connection members may include n (n=2) connection conduits for interconnecting the refrigerant pipes in the state in which ends of the connection conduits are inserted into the refrigerant pipes. When n is equal to or greater than 3, at least one of the connection conduits may have an inner diameter equivalent to 5% to 99% of the inner diameter of each of the other connection conduits.

Consequently, the liquid refrigerant may be divided and distributed into the respective connection conduits such that the liquid refrigerant can be guided to different refrigerant pipes.

In addition, the liquid refrigerant may be divided and distributed into the connection conduits at different flow speeds and flow rates due to different inner diameters of the connection conduits.

In general, cooling speed is greatly affected by the circulation of the liquid refrigerant. For this reason, the flow speed of the liquid refrigerant is critical. As a result, it is advantageous to supply the liquid refrigerant to the cooling plates, in which cooling is actually performed, at a high flow speed. Consequently, the connection conduits through which the liquid refrigerant is distributed into the cooling plates may have a relatively small inner diameter. The fourth refrigerant pipes, which communicate with the respective cooling plates, may be connected to the connection conduits through which the liquid refrigerant is distributed into the cooling plates.

Meanwhile, it is advantageous for a large amount of liquid refrigerant not having undergone heat exchange, i.e. a large amount of liquid refrigerant having a temperature substantially equal to the temperature of the liquid refrigerant when the liquid refrigerant is introduced through the refrigerant introduction port, to flow along the third refrigerant pipes, which guide the overall circulation of the liquid refrigerant, and to be divided and distributed through the respective pipe connection members, before the liquid refrigerant is supplied to the cooling plates. For this reason, the connection conduits connected to the third refrigerant pipes may have a relatively large inner diameter.

That is, in the cooling system according to the present invention, the connection conduits connected to the respective refrigerant pipes may have different inner diameters such that the liquid refrigerant can be distributed into the respective refrigerant pipes at different flow speeds and different flow rates. As described above, the difference in inner diameter between the connection conduits may be 5% to 99%.

If the difference in inner diameter between the connection conduits is less than 1%, the liquid refrigerant is little pressurized and accelerated when the liquid refrigerant is divided, with the result that rapid circulation in the cooling plates is not achieved, which is not desirable. If the difference in inner diameter between the connection conduits is greater than 99%, on the other hand, the flow pressure of the liquid refrigerant is increased, whereas the flow speed of the liquid refrigerant is decreased, which is also not desirable.

In consideration of the above description, the difference in inner diameter between the connection conduits may be specifically 10% to 90%, and more specifically 30% to 80%.

As described above, the flow speed and flow rate of the liquid refrigerant affect the cooling uniformity and efficiency of the cooling system. In the present invention, therefore, the inner diameters of the refrigerant pipes may also be designed in consideration of the flow speed and flow rate of the liquid refrigerant. Consequently, the flow speed and flow rate of the liquid refrigerant flowing in the refrigerant pipes may be set based on the inner diameters of the connection conduits and the inner diameters of the refrigerant pipes connected to the connection conduits.

In the cooling system according to the present invention, however, in the case in which the third refrigerant pipes, which guide the overall circulation of the liquid refrigerant, and the fourth refrigerant pipes, which guide only a portion of the liquid refrigerant, are considerably different from each other in terms of the flow speed and flow rate of the liquid refrigerant, the overall mobility of the liquid refrigerant may be reduced or the liquid refrigerant may stagnate at specific points in the cooling system (for example, the pipe connection members through which the liquid refrigerant is combined), with the result that the cooling efficiency of the cooling system may be greatly reduced. For this reason, the ratio of the inner diameter of the fourth refrigerant pipes to that of the third refrigerant pipes may have a specific value.

In a concrete example, each of the fourth refrigerant pipes may have an inner diameter equivalent to 5% to 99% of the inner diameter of each of the third refrigerant pipes.

The inner diameter of each of the fourth refrigerant pipes may be set to accelerate the liquid refrigerant toward the cooling plates in the same manner as in the pipe connection members. If the difference in inner diameter between the fourth refrigerant pipes and the third refrigerant pipes is less than 1%, the liquid refrigerant is little accelerated, with the result that rapid circulation in the cooling plates is not achieved, which is not desirable. If the difference in inner diameter between the fourth refrigerant pipes and the third refrigerant pipes is greater than 99%, on the other hand, the flow pressure of the liquid refrigerant is increased and fluid resistance is increased, with the result that the flow speed of the liquid refrigerant is greatly decreased, which is also not desirable.

In the present invention, as previously described, the fourth refrigerant pipes may be classified into fourth refrigerant pipes for guiding the liquid refrigerant to the cooling plates and fourth refrigerant pipes for guiding the liquid refrigerant from the cooling plates to the pipe connection members. The fourth refrigerant pipes for guiding the liquid refrigerant to the cooling plates and the fourth refrigerant pipes for guiding the liquid refrigerant from the cooling plates to the pipe connection members may be different from each other in terms of size.

Specifically, the fourth refrigerant pipes for guiding the liquid refrigerant from the cooling plates to the pipe connection members may have a relatively large inner diameter, which is advantageous in discharging a large amount of liquid refrigerant from the cooling plates to the pipe connection members.

However, it is not desirable for the inner diameter of the fourth refrigerant pipes to be equal to the inner diameter of the third refrigerant pipes, since it is advantageous for the flow speed of the liquid refrigerant to be high even in the above structure. In this case, therefore, each of the fourth refrigerant pipes may have an inner diameter equivalent to 30% to 99%, and specifically 60% to 99%, of the inner diameter of each of the third refrigerant pipes.

On the other hand, the fourth refrigerant pipes for guiding the liquid refrigerant to the cooling plates may have a relatively small inner diameter in order to accelerate the liquid refrigerant. For example, each of the fourth refrigerant pipes may have an inner diameter equivalent to 30% to 99%, specifically 10% to 90%, and more specifically 50% to 80%, of the inner diameter of each of the third refrigerant pipes.

Each of the connection conduits is inserted into a corresponding one of the refrigerant pipes in an interference fitting fashion such that the refrigerant pipes are connected to the connection conduits. For such interference fitting, each of the refrigerant pipes may have an inner diameter smaller than the diameter of a corresponding one of the connection conduits. Specifically, each of the refrigerant pipes may have an inner diameter equivalent to 70% to 100% of the diameter of a corresponding one of the connection conduits. In addition, in this structure, the liquid refrigerant may be accelerated when the liquid refrigerant flows into the refrigerant pipes through the connection conduits.

If each of the refrigerant pipes has an inner diameter less than 70% of the diameter of a corresponding one of the connection conduits, the liquid refrigerant does not smoothly flow to the refrigerant pipes since the inner diameter of each of the refrigerant pipes is too small. Furthermore, interference fitting is substantially impossible, which is not desirable. If each of the refrigerant pipes has an inner diameter greater than 100% of the diameter of a corresponding one of the connection conduits, each of the refrigerant pipes and a corresponding one of the connection conduits cannot be securely coupled to each other, which is also not desirable.

The refrigerant pipes may be configured to have at least one selected from between a straight structure and a curved structure.

For example, each of the fourth refrigerant pipes, which are connected to the cooling plates, may have a curved structure such that the fourth refrigerant pipes can be flexibly connected to the cooling plates regardless of the positions of the cooling plates. The third refrigerant pipes, which guide the overall circulation of the liquid refrigerant in the cooling system, may have a straight structure such that the length of the third refrigerant pipes is minimized.

Each of the straight refrigerant pipes may be made of a rigid plastic material. For example, the rigid plastic material may be high-strength nylon or polyvinyl chloride, which exhibits high mechanical strength and high insulation for the liquid refrigerant. However, the present invention is not limited thereto.

In addition, each of the straight refrigerant pipes may be coupled to a corresponding one of the pipe connection members as the result of the end of each of the straight refrigerant pipes wrapping the corresponding one of the pipe connection members by thermal shrinkage. According to circumstances, each of the straight refrigerant pipes and a corresponding one of the pipe connection members may be more securely coupled to each other using a binding member, such as a clamping member.

Each of the curved refrigerant pipes may be made of a flexible rubber material that is capable of being partially stretched or curved such that the curved refrigerant pipes can be flexibly connected to the cooling plates. Specifically, each of the curved refrigerant pipes may be made of ethylene propylene diene monomer (EPDM), which exhibits high elasticity and mechanical strength.

In addition to the fourth refrigerant pipes, the first refrigerant pipe and the second refrigerant pipe may be curved so as to flexibly correspond to the positions of the refrigerant introduction port and the refrigerant discharge port.

In addition, each of the curved refrigerant pipes may be securely coupled to a corresponding one of the pipe connection members as the result of a clamping member wrapping the end of the curved refrigerant pipe in the state in which the curved refrigerant pipe is inserted into a corresponding one of the connection conduits of the pipe connection member.

Meanwhile, in a concrete example, each of the cooling plates may be configured to have a structure in which a first conduit and a second conduit, which communicate with the hollow flow channel in the cooling plate, protrude outward from the cooling plate, the first conduit of each of the cooling plates may be connected to a corresponding one of the fourth refrigerant pipes into which the liquid refrigerant is introduced, and the second conduit of each of the cooling plates may be connected to a corresponding one of the fourth refrigerant pipes from which the liquid refrigerant is discharged.

Each of the cooling plates may include a base plate having a plurality of protrusions formed thereon and a cover plate coupled to the base plate in the state of being in tight contact with the protrusions for defining a flow channel in the remaining space of the base plate excluding the protrusions.

Consequently, each of the cooling plates may be configured to have a structure in which the flow channel, along which the liquid refrigerant flows, is defined in the space in the base plate defined by the protrusions. The base plate and the cover plate may be fastened to each other using mechanical fastening members, such as bolts and nuts. In addition, a water-tight member, made of rubber or silicon, may be provided between the base plate and the cover plate in order to prevent the leakage of liquid refrigerant from between the base plate and the cover plate.

The protrusions may include first protrusions discontinuously protruding from one end of the base plate toward the other end of the base plate and a second protrusion disposed between the first protrusions, the second protrusion continuously protruding from one end of the base plate toward the other end of the base plate.

A vortex may be generated in the liquid refrigerant between the discontinuously protruding first protrusions, whereby the flow speed of the liquid refrigerant may be increased.

In general, cooling speed is proportional to the flow speed of liquid refrigerant before heat exchange and to the speed at which the liquid refrigerant is distributed over the area to be cooled. Therefore, it is advantageous for the liquid refrigerant to rapidly flow and be distributed in the flow channel defined in each of the cooling plates, in which cooling is performed through actual heat exchange.

In the present invention, as described above, a vortex may be generated in the liquid refrigerant between the discontinuously protruding first protrusions, by which the liquid refrigerant is irregularly divided, with the result that the liquid refrigerant may flow while being more rapidly distributed, thereby increasing the cooling speed of each of the cooling plates and thus improving the cooling efficiency of each of the cooling plates.

Each of the first protrusions may be generally configured to have a streamlined structure in order to reduce fluid resistance to the liquid refrigerant. In addition, the first protrusions may have different sizes and shapes. Alternatively, the first protrusions may have the same size and shape. In addition, the distributed liquid refrigerant is circulated along the hollow flow channel while being guided by the continuously protruding second protrusions.

The base plate may be provided on the surface thereof opposite the surface on which the protrusions are formed with an insulating material, such as plastic foam or heat-resistant ceramic, in order to prevent the introduction of heat into the flow channel from the outside, excluding a corresponding one of the battery modules.

The cover plate may be provided on the surface thereof that is disposed in tight contact with a corresponding one of the battery modules, specifically on the surface thereof opposite the surface that faces the base plate, with a thermal interface material (TIM) pad for accelerating thermal conduction in order to achieve more efficient thermal conduction between the cover plate and the battery module. The thermal interface material pad reduces thermal conduction resistance in the state of being in contact with the battery module.

The thermal interface material pad may be made of thermally conductive grease, thermally conductive epoxy-based bond, thermally conductive silicone, thermally conductive adhesive tape, or a graphite sheet. However, the present invention is not limited thereto. Any one of the above-mentioned materials may be used, or two or more of the above-mentioned materials may be combined.

As described above, each of the cooling plates is configured to have a structure in which heat generated from a corresponding one of the battery modules is removed by the liquid refrigerant flowing in the cooling plate. Specifically, each of the cooling plates may be configured such that a corresponding one of the battery modules is mounted on the cover plate and such that each of the cooling plates receives heat from a corresponding one of the battery modules and transfers the heat to the liquid refrigerant flowing in the hollow flow channel, thereby cooling the battery module. Consequently, it is possible for the cooling plates to cool the battery modules through the above-described process.

In addition, at least one of the cooling plates may have an area equivalent to 100% to 300% of the area of each of the other cooling plates, and the at least one of the cooling plates may be different in size and shape of the protrusions from the other cooling plates.

The area of each of the cooling plates may correspond to the size of a corresponding one of the battery modules, which is mounted on the cooling plate. In the cooling system according to the present invention, a plurality of battery modules having different sizes and shapes may be mounted on cooling plates having different areas such that the battery modules can be cooled by the respective cooling plates.

In a middle or large-sized battery pack including a plurality of battery modules, however, the overall performance of the battery pack is reduced if the performance of some of the battery modules is reduced. One of the main factors that cause such performance nonuniformity is nonuniformity of cooling between the battery modules. For this reason, it is necessary for the cooling system to have a structure that is capable of minimizing the temperature difference between the battery modules.

In the cooling system according to the present invention, therefore, the flow speed and flow rate of the liquid refrigerant may be set based on the inner diameters of the connection conduits and the inner diameters of the refrigerant pipes connected to the connection conduits, as described above. Consequently, the flow speed and flow rate of the liquid refrigerant may be changed in the cooling plates, which have different cooling areas, whereby the cooling speed in the cooling plates may be maintained uniform.

In addition, the flow speed and flow rate of the liquid refrigerant in each of the cooling plates may be changed by varying the size and the shape of the protrusions.

For example, a cooling plate having a relatively small cooling area may be configured such that a small number of protrusions are provided and the shape of the protrusions is relatively small. As a result, the liquid refrigerant may be circulated along the hollow flow channel defined in the cooling plate at a relatively low flow speed and a relatively low flow rate. On the other hand, a cooling plate having a relatively large cooling area may be configured such that a large number of protrusions are provided and the shape of the protrusions is relatively large. As a result, the liquid refrigerant may be circulated along the hollow flow channel defined in the cooling plate at a relatively high flow speed and a relatively high flow rate.

The cover plate and the base plate of each of the cooling plates may be made of a material that exhibits high thermal conductivity. Specifically, the cover plate and the base plate of each of the cooling plates may be made of at least one selected from among copper, aluminum, tin, nickel, stainless steel, and thermally conductive polymer. However, the present invention is not limited thereto.

In brief, the cooling structure of the cooling system according to the present invention is configured such that the liquid refrigerant is circulated along the third refrigerant pipes, some of the liquid refrigerant in the third refrigerant pipes is introduced into the cooling plates through the pipe connection members, cooling is performed in the cooling plates as described above, and the liquid refrigerant is gathered in the third refrigerant pipes.

More specifically, the liquid refrigerant introduced into the first refrigerant pipe through the refrigerant introduction port may be divided into first liquid streams, which flow in the third refrigerant pipes via the pipe connection members, and second liquid streams, which flow in the fourth refrigerant pipes via the pipe connection members.

The second liquid streams may be introduced into the hollow flow channels in the cooling plates via the fourth refrigerant pipes and the first conduits connected to the fourth refrigerant pipes, may flow along the hollow flow channels, and may be discharged from the cooling plates via the second conduits and the fourth refrigerant pipes connected to the second conduits.

Subsequently, the discharged second liquid streams may be guided to the pipe connection members via the fourth refrigerant pipes connected to the second conduits and may be combined with the first liquid streams flowing in the third refrigerant pipes connected to pipe connection members, and the combined liquid refrigerant may be discharged through the refrigerant discharge port via the second refrigerant pipe.

In a concrete example, the cooling system may be configured such that N−1 (N≥3) cooling plates are arranged side by side in the lateral direction to constitute a cooling plate array, a first cooling plate is disposed in front of the cooling plates so as to correspond to the middle part of the cooling plate array, and the refrigerant introduction port and the refrigerant discharge port are arranged side by side in front of the first cooling plate in the state in which the refrigerant introduction port and the refrigerant discharge port are connected to the first refrigerant pipe and the second refrigerant pipe, respectively.

In this case, the first cooling plate and the N−1 (N≥3) cooling plates may be arranged to have an overall T-shaped structure when viewed from above.

The refrigerant introduction port and/or the refrigerant discharge port may be provided therein with a temperature sensor for measuring the temperature of the liquid refrigerant that passes through the refrigerant introduction port and/or the refrigerant discharge port.

Some of the third refrigerant pipes may be arranged along opposite sides of the first cooling plate in the state of being connected to the first refrigerant pipe and the second refrigerant pipe via corresponding ones of the pipe connection members, and the other third refrigerant pipes may be connected to the third refrigerant pipes that are arranged along the opposite sides of the first cooling plate via corresponding ones of the pipe connection members disposed between the first cooling plate and the cooling plate array.

The fourth refrigerant pipes may be further connected to the pipe connection members, and the cooling plates may communicate with the refrigerant introduction port or the refrigerant discharge port in the state of being connected to the fourth refrigerant pipes.

In accordance with another aspect of the present invention, there is provided a battery pack including the cooling system with the above-stated construction, the battery pack including a plurality of battery modules, each of which includes a plurality of battery cells and which are mounted on the cooling plates of the cooling system in the state of being in tight contact with the cooling plates, a bottom housing, on which the battery modules and the cooling system are mounted, and a top housing coupled to an outer edge of the bottom housing for isolating the battery modules and the cooling system from the outside, wherein at least one of the battery modules is different from the other battery modules in terms of the direction in which the batteries are arranged.

The battery pack according to the present invention includes battery modules configured to have different battery cell arrangement structures, whereby it is possible to configure the battery pack such that the battery pack has various sizes, shapes, and structures. Consequently, it is possible to overcome limitations in installation of the battery pack in a device, such as a vehicle, and to minimize the ratio of the volume to the capacity of the battery pack, whereby it is possible to maximize the utilization of the space in the device. In addition, it is possible to more easily repair or inspect the battery pack in the limited space.

In a concrete example, the battery modules may be classified into a first battery module assembly and a second battery module assembly, and the direction in which the battery cells belonging to the first battery module assembly are arranged may be different from the direction in which the battery cells belonging to the second battery module assembly are arranged.

In other words, the battery modules constituting the battery pack according to the present invention may be classified into a first battery module assembly and a second battery module assembly depending on the direction in which the battery cells constituting the battery modules are arranged.

The first battery module assembly may be mounted on the first cooling plate and/or the cooling plate located at the middle part of the cooling plate array, and the second battery module assembly may be mounted on the other cooling plates of the cooling plate array.

The battery pack is configured to have a structure in which the battery module assemblies are generally arranged in a T shape. Consequently, in the case in which the battery pack is installed in the central region of a device, such as a vehicle, when viewed from above, weight may be equally applied to the left and right sides of the device, whereby it is possible to dynamically design the device in consideration of the weight applied to the device by the battery pack with greater ease.

In the battery pack according to the present invention, the kind of each of the battery cells is not particularly restricted. In a concrete example, the battery cell may be a lithium secondary battery, such as a lithium ion battery or a lithium ion polymer battery, which exhibits high energy density, discharge voltage, and output stability.

In general, a lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the mixture. A filler may be further added to the mixture as needed.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_3$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder is a component assisting in binding between the active material and conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as it does not cause chemical changes in a battery to which the filler is applied, and is made of a fibrous material. As examples of the filler, there may be used olefin polymers, such as polyethylene and polypropylene; and fibrous materials, such as glass fiber and carbon fiber.

The negative electrode may be manufactured by applying and drying a negative electrode active material to a negative electrode current collector. The above-described components may be selectively added to the negative electrode active material as needed.

As the negative electrode active material, for example, there may be used carbon, such as non-graphitizing carbon or graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 8$); a lithium metal; a lithium alloy; a silicon-based alloy; a tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The separator is interposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In a case in which a solid electrolyte, such as a polymer, is used as an electrolyte, the solid electrolyte may also function as the separator.

In addition, in a concrete example, the separator may be an organic/inorganic composite porous safety reinforcing separator (SRS) for improving the safety of a battery.

The SRS separator may be manufactured by applying inorganic particles and a binder polymer, as active layer components, to a polyolefin separator base. In addition to a porous structure included in the separator base, a uniform porous structure may be formed due to interstitial volumes among the inorganic particles, as the active layer component.

In the case in which the organic/inorganic composite porous separator is used, it is possible to restrain the increase in thickness of the battery due to swelling at the time of formation as compared with the case in which a normal separator is used. In addition, in the case in which a polymer that can gel at the time of impregnating a liquid electrolytic solution is used as the binder polymer, the polymer may also be used as an electrolytic.

In addition, the organic/inorganic composite porous separator may exhibit excellent adhesive characteristics by adjusting the contents of the inorganic particles and the binder polymer, which are active layer components in the separator. Consequently, a battery assembly process may be easily carried out.

The inorganic particles are not particularly restricted so long as the inorganic particles are electrochemically stable. That is, the inorganic particles that can be used in the present invention are not particularly restricted so long as the inorganic particles are not oxidized and/or reduced within an operating voltage range (e.g. 0 to 5 V based on Li/Li+) of a battery to which the inorganic particles are applied. In particular, in the case in which inorganic particles having ion conductivity are used, it is possible to improve ion conductivity in an electrochemical element, thereby improving the performance of the battery. Consequently, it is preferable that ion conductivity of the inorganic particles be as high as possible. In addition, in the case in which the inorganic particles have high density, it may be difficult to disperse the inorganic particles at the time of coating, and the weight of the battery may increase. For these reasons, it is preferable that density of the inorganic particles be as low as possible. Additionally, in the case in which the inorganic particles have high permittivity, a degree of dissociation of electrolyte salt, such as lithium salt, in a liquid electrolyte may increase, thereby improving ion conductivity of the electrolytic solution.

The non-aqueous electrolytic solution containing lithium salt is composed of a polar organic electrolytic solution and lithium salt. As the electrolytic solution, a non-aqueous liquid electrolytic solution, an organic solid electrolyte, or an inorganic solid electrolyte may be used.

As examples of the non-aqueous liquid electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature retention characteristics, the non-aqueous electrolytic solution may further include carbon dioxide gas.

In accordance with a further aspect of the present invention, there is provided a device including the battery pack. The device may be any one selected from the group consisting of an electric vehicle, a hybrid electric vehicle, and a plug-in hybrid electric vehicle.

BRIEF DESCRIPTION OF DRAWINGS

The above and other objects, features and other advantages of the present invention will be more clearly understood from the following detailed description taken in conjunction with the accompanying drawings, in which:

FIGS. 1 and 2 are perspective views showing a cooling system according to an embodiment of the present invention;

FIG. 3 is an enlarged view showing a refrigerant introduction port;

FIG. 4 is an enlarged view showing the connection between a pipe connection member and refrigerant pipes;

FIG. 5 is an enlarged view showing the connection between another pipe connection member and other refrigerant pipes;

FIGS. 6 and 7 are enlarged views showing a cooling plate;

FIGS. 8 and 9 are enlarged views showing another cooling plate; and

FIGS. 10 and 11 are perspective views showing a battery pack according to an embodiment of the present invention.

DETAILED DESCRIPTION OF THE EMBODIMENTS

Now, exemplary embodiments of the present invention will be described in detail with reference to the accompanying drawings. It should be noted, however, that the scope of the present invention is not limited by the illustrated embodiments.

FIGS. 1 and 2 are perspective views showing a cooling system according to an embodiment of the present invention, and FIG. 3 is an enlarged view showing a refrigerant introduction port.

Referring to these figures, the cooling system, denoted by reference numeral 100, includes a refrigerant introduction port 102, through which liquid refrigerant is introduced, a refrigerant discharge port 104, through which the liquid refrigerant is discharged, a plurality of refrigerant pipes 131, 132, 140a, 140b, 142a, 142b, 150a, 150b, 152a, 152b, 154a, 154b, 156a, and 156b configured to communicate with the refrigerant introduction port 102 and the refrigerant discharge port 104, pipe connection members 160, 162, 164, and 166 configured to interconnect two or more of the refrigerant pipes such that the refrigerant pipes communicate with each other, and a plurality of cooling plates 110, 122, 124, and 126, each of which has one surface on which a corresponding battery module is mounted.

In the refrigerant introduction port 102 is mounted a temperature sensor 170 for measuring the temperature of the liquid refrigerant that passes through the refrigerant introduction port 102. In the present invention, for example, water, R-11, R-12, R-22, R-134A, R-407C, or R-410A may be used as the liquid refrigerant.

The cooling plates 110, 122, 124, and 126 include a cooling plate array 120, in which the cooling plates 122, 124, and 126 are arranged side by side in the lateral direction, and a first cooling plate 110 disposed in front of the cooling plates 122, 124, and 126 so as to correspond to the middle part of the cooling plate array 120.

Consequently, the cooling plates 110, 122, 124, and 126 are arranged to have an overall T-shaped structure.

The refrigerant pipes 131, 132, 140a, 140b, 142a, 142b, 150a, 150b, 152a, 152b, 154a, 154b, 156a, and 156b include a first refrigerant pipe 131 connected to the refrigerant introduction port 102, a second refrigerant pipe 132 connected to the refrigerant discharge port 104, a plurality of third refrigerant pipes 140a, 140b, 142a, and 142b connected to the pipe connection members 160, 162, 164, and 166, respectively, for guiding the liquid refrigerant such that the liquid refrigerant flows from the refrigerant introduction port 102 to the refrigerant discharge port 104, and a plurality of fourth refrigerant pipes 150a, 150b, 152a, 152b, 154a, 154b, 156a, and 156b connected to the third refrigerant pipes 140a, 140b, 142a, and 142b via the pipe connection members 160, 162, 164, and 166, the fourth refrigerant pipes 150a, 150b, 152a, 152b, 154a, 154b, 156a, and 156b also being connected to the cooling plates 110, 122, 124, and 126.

The refrigerant introduction port 102 and the refrigerant discharge port 104 are arranged side by side in front of the first cooling plate 110 in the state in which the refrigerant introduction port 102 and the refrigerant discharge port 104 are connected to the first refrigerant pipe 131 and the second refrigerant pipe 132, respectively.

The third refrigerant pipe 140a is connected to the first refrigerant pipe 131 via the pipe connection member 160. The third refrigerant pipe 140b is connected to the second refrigerant pipe 132 via the pipe connection member 162.

The third refrigerant pipes 140a and 140B are arranged along the opposite sides of the first cooling plate 110.

The third refrigerant pipes 140a and 140B, arranged along the opposite sides of the first cooling plate 110, are connected respectively to the third refrigerant pipes 142a and 142B via the pipe connection members 164 and 166, which are disposed between the first cooling plate 110 and the cooling plate array 120.

That is, in the present invention, the third refrigerant pipes 140a, 140b, 142a, and 142b are connected to the pipe connection members 160, 162, 164, and 166 in order to guide the overall circulation of the liquid refrigerant.

In addition, some of the third refrigerant pipes, i.e. the third refrigerant pipes 140a and 140B, are connected to the first refrigerant pipe 131 and the second refrigerant pipe 132, respectively, with the result that the refrigerant introduction port 102 and the refrigerant discharge port 104 communicate with the third refrigerant pipes 140a, 140b, 142a, and 142b.

The fourth refrigerant pipes 150a, 150b, 152a, 152b, 154a, 154b, 156a, and 156b are pipes for interconnecting the third refrigerant pipes 140a, 140b, 142a, and 142b, along which the liquid refrigerant is circulated, and the cooling plates 110, 122, 124, and 126 between the third refrigerant pipes 140a, 140b, 142a, and 142b and the cooling plates 110, 122, 124, and 126. A pair of fourth refrigerant pipes is connected to each of the cooling plates, and a pair of fourth refrigerant pipes is connected to different third refrigerant pipes.

The liquid refrigerant is introduced into the first cooling plate 110 and is discharged from the first cooling plate 110 as follows. One selected from between a pair of fourth refrigerant pipes 150a and 150b, i.e. the fourth refrigerant pipe 150a, guides the liquid refrigerant from the third refrigerant pipe 140a to the first cooling plate 110, and the other selected from between the fourth refrigerant pipes 150a and 150b, i.e. the fourth refrigerant pipe 150b, guides the liquid refrigerant from the first cooling plate 110 to the third refrigerant pipe 140b. The flow of the liquid refrigerant to the other cooling plates 122, 124, and 126 is the same as the flow of the liquid refrigerant to first cooling plate 110.

Consequently, the fourth refrigerant pipes 150a and 150b communicate with the third refrigerant pipes 140a, 140b, 142a, and 142b, with the result that the fourth refrigerant pipes 150a and 150b communicate with the refrigerant introduction port 102 and the refrigerant discharge port 104, respectively.

The first refrigerant pipe 131 has a larger inner diameter than the third refrigerant pipe 140a such that a large amount of liquid refrigerant is introduced into the first refrigerant pipe 131 and such that the liquid refrigerant is accelerated in the third refrigerant pipe 140a. The same equally applies to the second refrigerant pipe 132.

In addition, the third refrigerant pipes 140a, 140b, 142a, and 142b have a larger inner diameter than the fourth refrigerant pipes 150a, 150b, 152a, 152b, 154a, 154b, 156a, and 156b.

FIGS. 4 and 5 show the structure of the pipe connection members. For the sake of convenience, the structure in which the pipe connection members are connected to the first refrigerant pipe 131 and the second refrigerant pipe 132 will be described by way of example.

Referring first to FIG. 4, the pipe connection member 160 includes a first connection conduit 180, a second connection conduit 182 and a third connection conduit 184, ends of which are inserted into the refrigerant pipes in order to interconnect the refrigerant pipes.

The first connection conduit 180 is inserted into one end of the first refrigerant pipe 131 in an interference fitting fashion.

In addition, the first refrigerant pipe 131 may be securely coupled to the pipe connection member 160 by a clamping member 192, which is disposed so as to wrap the end of the first refrigerant pipe 131, in the state in which the first connection conduit 180 of the pipe connection member 160 is inserted into the end of the first refrigerant pipe 131.

The second connection conduit 182 is inserted into one end of the third refrigerant pipe 140a in an interference fitting fashion. In this state, the third refrigerant pipe 140a thermally shrinks such that the end of the third refrigerant pipe 140a wraps the second connection conduit 182. Although not shown in the figure, the third refrigerant pipe 140a may be more securely coupled to the pipe connection member 160 by a binding member, such as a clamping member.

The third connection conduit 184 is inserted into one end of the fourth refrigerant pipe 150a in an interference fitting fashion.

In addition, the fourth refrigerant pipe 150a may be securely coupled to the pipe connection member 160 by a clamping member 193, which is disposed so as to wrap the end of the fourth refrigerant pipe 150a, in the state in which the third connection conduit 184 of the pipe connection member 160 is inserted into the end of the fourth refrigerant pipe 150a.

When the liquid refrigerant reaches the pipe connection member 160 through the first connection conduit 180 via the first refrigerant pipe 131, the liquid refrigerant is divided and distributed into the second connection conduit 182 and the third connection conduit 184. Specifically, the liquid refrigerant is divided into a first liquid stream 191, which flows in the third refrigerant pipe 140a, and a second liquid stream 192, which flows in the fourth refrigerant pipe 150a.

In addition, the connection conduits 180, 182, and 184 have different inner diameters. Specifically, the inner diameter of the first connection conduit 180 is greater than the inner diameter of the second connection conduit 182, and the inner diameter of the second connection conduit 182 is greater than the inner diameter of the third connection conduit 184.

As a result, the first liquid stream 191, which flows from the first connection conduit 180 to the second connection conduit 182, is accelerated, and the second liquid stream 192, which flows from the first connection conduit 180 to the third connection conduit 184, is accelerated.

The pipe connection member 162 (see FIG. 5), which is connected to the second refrigerant pipe 132, has a structure identical to the structure of the pipe connection member 160. However, the liquid refrigerant flows in the pipe connection member 162, which is connected to the second refrigerant pipe 132, toward the refrigerant discharge port 104. As a result, a first liquid stream 191a, which flows in the third refrigerant pipe 140b, and a second liquid stream 192a, which flows in the fourth refrigerant pipe 150b are combined in the pipe connection member 162. The combined liquid refrigerant is discharged through the refrigerant discharge port 104 via the second refrigerant pipe 132.

The structure of the pipe connection members 164 and 166 is substantially identical to the structure of the pipe connection members 160 and 162 except that each of the pipe connection members 164 and 166 has a different number of connection conduits from the number of the connection conduits of each of the pipe connection members 160 and 162 so as to correspond to the number of refrigerant pipes connected to each of the pipe connection members 164 and 166.

In addition, all of the pipe connection members 160, 162, 164, and 166 have the same structure in which the liquid refrigerant is divided and distributed into the third refrigerant pipe and the fourth refrigerant pipe and the same structure in which the liquid refrigerant flowing in the third refrigerant pipe and the liquid refrigerant flowing in the fourth refrigerant pipe are combined.

FIGS. 6 and 7 show the cooling plate 124.

Referring to FIGS. 6 and 7, the cooling plate 124 includes a base plate 220 having a plurality of protrusions 222, 224, and 226 formed thereon and a cover plate 210 coupled to the base plate 220 in the state of being in tight contact with the protrusions 222, 224, and 226 for defining a flow channel 230 in the remaining space of the base plate 220 excluding the protrusions 222, 224, and 226.

That is, the cooling plate 124 is configured to have a structure in which the flow channel 230, along which the liquid refrigerant flows, is defined in the space in the base plate 220 defined by the protrusions 222, 224, and 226.

The cover plate 210 is provided on the surface thereof that is disposed in tight contact with a corresponding battery module with a thermal interface material pad 212 for accelerating thermal conduction in order to achieve more efficient thermal conduction between the cover plate 210 and the battery module.

The base plate 220 is provided on the surface thereof opposite the surface on which the protrusions are formed with an insulating material 228 for preventing the introduction of heat into the flow channel 230 from the outside, excluding the battery module.

In addition, the base plate 220 and the cover plate 210 are fastened to each other using bolts and nuts.

Meanwhile, the protrusions 222, 224, and 226 include first protrusions 222 and 224, which protrude from one end of the base plate 220 toward the other end of the base plate 220, and a second protrusion 226, which is disposed between the first protrusions 222 and 224 and which protrudes from one end of the base plate 220 toward the other end of the base plate 220.

Each of the first protrusions 222 and 224 has a length smaller than the length of the second protrusion 226. In the present invention, the shape of each of the first protrusions 222 and 224, which separately protrude from the base plate 220, is defined as a discontinuous shape. On the other hand, the shape of the second protrusion 226, which extends from one end of the base plate 220, is defined as a continuous shape.

In the above structure, the liquid refrigerant is irregularly divided by the first protrusions 222 and 224, with the result that the liquid refrigerant is distributed more rapidly and, at the same time, a vortex is generated in the region in which the liquid refrigerant is divided, whereby the flow speed of the liquid refrigerant is increased.

Each of the first protrusions 222 and 224 is generally configured to have a streamlined structure in order to reduce fluid resistance to the liquid refrigerant.

The divided and distributed liquid refrigerant flows along the second protrusion 226, which is longer than each of the first protrusions 222 and 224. The flow direction of the liquid refrigerant is changed by about 180 degrees at the end of the second protrusion 226.

The above structure has an advantage in that the flow distance of the liquid refrigerant that flows along the hollow flow channel 230 defined in the cooling plate 124 is increased, thereby improving cooling efficiency.

The cooling plate 124 is configured to have a structure in which a first conduit 201 and a second conduit 202, which communicate with the hollow flow channel 230, protrude outward from the cooling plate 124.

The fourth refrigerant pipe 154a, into which the liquid refrigerant is introduced, is connected to the first conduit 201, and the fourth refrigerant pipe 154b, from which the liquid refrigerant is discharged, is connected to the second conduit 202.

Consequently, the second liquid stream of the liquid refrigerant is introduced into the hollow flow channel 230 of the cooling plate 124 through the first conduit 201 via the fourth refrigerant pipe 154a, and performs cooling while flowing along the hollow flow channel 230.

Subsequently, the second liquid stream is discharged from the cooling plate 124 via the second conduit 202 and the fourth refrigerant pipe 154b, which is connected to the second conduit 202.

The discharged second liquid stream is guided to the pipe connection member 164 (see FIG. 2) via the fourth refrigerant pipe 154b, which is connected to the second conduit 202, and is combined with the first liquid stream in the third refrigerant pipe 142b (see FIG. 1), which is connected to the pipe connection member 164. The combined liquid refrigerant may be discharged through the refrigerant discharge port 104 via the second refrigerant pipe 132.

The cooling and flow processes of the liquid refrigerant in each of the cooling plates 110, 122, and 126 are identical to those of the liquid refrigerant in the cooling plate 124.

FIGS. 8 and 9 show a cooling plate having a larger cooling area than the cooling plate shown in FIGS. 6 and 7.

Referring to FIGS. 8 and 9, the cooling plate 122 has a cooling area equivalent to about 200% of the cooling area of the cooling plate 124 shown in FIGS. 6 and 7.

That is, the cooling plate 122 is similar in basic structure to the cooling plate 124 shown in FIGS. 6 and 7. However, the size of the cooling plate 122 is different from the size of the cooling plate 124. In addition, as shown in FIG. 9, the size and shape of protrusions 251 and 252 formed on a base plate 250 are different from the size and shape of the protrusions formed on the base plate of the cooling plate 124 shown in FIGS. 6 and 7.

Specifically, the protrusions 251 and 252 of the cooling plate 122 include first protrusions 251, which discontinuously protrude from one end of the base plate 250 toward the other end of the base plate 250, and second protrusions 252, which are disposed between the first protrusions 251 and which continuously protrude from one end of the base plate 250 toward the other end of the base plate 250.

In the above structure, the liquid refrigerant is divided by the discontinuously protruding first protrusions 251, and a vortex is generated due to the irregular flow of the liquid refrigerant, thereby increasing the flow speed of the liquid refrigerant while improving the distribution of the liquid refrigerant.

In the cooling system 100 according to the present invention described above, the coolant flow channels are defined in the cooling plates, on which the battery modules are mounted. Compared to the structure in which the coolant flow channels are defined between the battery modules or between the battery cells, therefore, the cooling system according to the present invention has a compact structure. In addition, the divided liquid refrigerant is introduced into the respective cooling plates to independently cool the battery modules mounted on the respective cooling plates, thereby achieving high cooling uniformity with respect to the battery modules.

Meanwhile, FIG. 10 is a partial perspective view showing a battery pack according to an embodiment of the present invention including the cooling system shown in FIGS. 1 to 9, and FIG. 11 is an overall perspective view of the battery pack according to the embodiment of the present invention.

Referring to FIGS. 10 and 11, the battery pack, denoted by reference numeral 300, includes a cooling system 100, a plurality of battery modules 321, 322, 323, and 324, each of which includes a plurality of battery cells and which are mounted on cooling plates 110, 122, 124, and 126 of the cooling system 100 in the state of being in tight contact with the cooling plates 110, 122, 124, and 126, a bottom housing 310, on which the battery modules 321, 322, 323, and 324 and the cooling system 100 are mounted, and a top housing 390 coupled to the outer edge of the bottom housing 310 for isolating the battery modules 321, 322, 323, and 324 and the cooling system 100 from the outside.

The bottom housing 310 includes a first bottom housing 311, which is configured to have a rectangular structure when viewed from above, and a second bottom housing 312, which is configured to have a rectangular structure when viewed from above. The second bottom housing 312 is connected to the middle region of a longer side of the outer edge of the first bottom housing 311.

A plurality of first fastening holes 313, through which the bottom housing 310 is coupled to the top housing 390 using coupling members, and a plurality of second fastening holes 314, through which the battery pack 300 is mounted and fixed to a device, are formed in the outer edge of the bottom housing 310.

The battery modules 321, 322, 323, and 324 are classified into a first battery module assembly 321 and 322 and a second battery module assembly 323 and 324. The direction in which battery cells belonging to the first battery module assembly 321 and 322 are arranged is different from the direction in which battery cells belonging to the second battery module assembly 323 and 324 are arranged. In addition, the size of each battery module of the first battery module assembly 321 and 322 is different from the size of each battery module of the second battery module assembly 323 and 324.

Each battery module of the first battery module assembly 321 and 322 includes a single unit module constituted by a plurality of battery cells. One battery module of the second battery module assembly 323 and 324 includes three unit modules 323a, 323b, and 323c, which are arranged adjacent to each other, and the other battery module of the second battery module assembly 323 and 324 includes three unit modules 324a, 324b, and 324c, which are arranged adjacent to each other.

Referring to FIG. 11, the top housing 390 is coupled to the outer edge of the bottom housing 310 using a plurality of fastening members 315 in the state in which the battery modules 321, 322, 323, and 324 are mounted in the top housing 390.

The top housing 390 is provided on the outer edge thereof with a plurality of beads 391 for improving rigidity of the top housing 390.

In various device operating conditions, therefore, it is possible to more effectively and safely protect the battery modules 321, 322, 323, and 324 in the battery pack 300 against external physical impact or stress.

The top housing 390 is provided at one side surface thereof with a vent unit 393 for discharging gas from the top housing 390.

The vent unit 393 is configured to have a structure in which each through hole 393a formed in one surface of the top housing 390 is covered by a micro-porous gas transmission film 393b.

The top housing 390 is provided in a region thereof corresponding to a manual service device 341 and a fuse box with an opening 392. The manual service device 341 is exposed outward through the opening 392 of the top housing 390.

At the time of repairing or inspecting the battery pack 300, therefore, it is possible for a worker to break the electrical connection of the battery pack 300 using the manual service device 341 and the fuse box, which are exposed through the opening 392 of the top housing 390, without removing the top housing 390 from the battery pack 300. Consequently, it is possible to effectively prevent the occurrence of an electrical accident, which may occur when the top housing 390 is removed from the battery pack 300.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, in the cooling system according to the present invention, the coolant flow channels are defined in the cooling plates, on which the battery modules are mounted. Compared to the structure in which the coolant flow channels are defined between the battery modules or between the battery cells, therefore, the cooling system according to the present invention has a compact structure. In addition, the divided liquid refrigerant is introduced into the respective cooling plates to independently cool the battery modules mounted on the respective cooling plates, thereby achieving high cooling uniformity with respect to the battery modules.

In addition, the battery pack according to the present invention includes battery modules configured to have different battery cell arrangement structures, whereby it is possible to configure the battery pack such that the battery pack has various sizes, shapes, and structures. Consequently, it is possible to overcome limitations in installation of the battery pack in a device, such as a vehicle, and to minimize the ratio of the volume to the capacity of the battery pack, whereby it is possible to maximize the utilization of space in the device. In addition, it is possible to more easily repair or inspect the battery pack in the limited space.

The invention claimed is:

1. A cooling system for cooling a plurality of battery modules, the cooling system comprising:

a refrigerant introduction port, through which liquid refrigerant is introduced, and a refrigerant discharge port, through which the liquid refrigerant is discharged;

a plurality of refrigerant pipes configured to communicate with the refrigerant introduction port or the refrigerant discharge port;

one or more pipe connection members configured to interconnect two or more of the refrigerant pipes such that the refrigerant pipes communicate with each other, the pipe connection members being configured to divide the liquid refrigerant or to change a flow direction of the liquid refrigerant between the connected refrigerant pipes; and a plurality of cooling plates, each of which has a hollow flow channel communicating with at least one of the refrigerant pipes and each of which has one surface on which a corresponding one of the battery modules is mounted, the liquid refrigerant being circulated along the hollow flow channel, wherein the liquid refrigerant is divided by the pipe connection members, the divided liquid refrigerant is supplied to a respective cooling plate of the plurality of cooling plates, and the divided liquid refrigerant is combined after being discharged from the respective cooling plates without passing through another cooling plate of the plurality of cooling plates, whereby the battery modules are cooled by the respective cooling plates as a result of thermal conduction of the divided liquid refrigerant, the refrigerant pipes include:

a first refrigerant pipe connected to the refrigerant introduction port;

a second refrigerant pipe connected to the refrigerant discharge port;

a plurality of third refrigerant pipes disposed between the first refrigerant pipe and the second refrigerant pipe in a state of being connected to the respective pipe connection members such that the third refrigerant pipes communicate with the first refrigerant pipe and the second refrigerant pipe; and a plurality of fourth refrigerant pipes connected to the third refrigerant pipes via the pipe connection members, the fourth refrigerant pipes being connected to the flow channels defined in the respective cooling plates such that the coolant only flows into and out of the cooling plates through the fourth refrigerant pipes.

2. The cooling system according to claim 1, wherein at least one of the pipe connection members is connected to at least one of the third refrigerant pipes and at least one of the fourth refrigerant pipes such that the liquid refrigerant is divided and distributed into the at least one of the third refrigerant pipes and the at least one of the fourth refrigerant pipes, thereby adjusting the flow direction of the liquid refrigerant.

3. The cooling system according to claim 1, wherein at least one of the pipe connection members is connected to at least one of the third refrigerant pipes and at least one of the fourth refrigerant pipes such that liquid refrigerant divided and distributed into the at least one of the third refrigerant pipes and the at least one of the fourth refrigerant pipes is combined into a single body of liquid refrigerant, thereby adjusting a flow rate of the liquid refrigerant.

4. The cooling system according to claim 1, wherein each of the pipe connection members comprises n (n≥2) connection conduits for interconnecting the refrigerant pipes in a state in which ends of the connection conduits are inserted into the refrigerant pipes.

5. The cooling system according to claim 1, wherein
each of the cooling plates is configured to have a structure in which a first conduit and a second conduit, which communicate with the hollow flow channel in the cooling plate, protrude outward from the cooling plate,
the first conduit of each of the cooling plates is connected to a corresponding one of the fourth refrigerant pipes into which the liquid refrigerant is introduced, and
the second conduit of each of the cooling plates is connected to a corresponding one of the fourth refrigerant pipes from which the liquid refrigerant is discharged.

6. The cooling system according to claim 5, wherein the liquid refrigerant introduced into the first refrigerant pipe through the refrigerant introduction port is divided into first liquid streams, which flow in the third refrigerant pipes via the pipe connection members, and second liquid streams, which flow in the fourth refrigerant pipes via the pipe connection members.

7. The cooling system according to claim 6, wherein the second liquid streams are introduced into the hollow flow channels in the cooling plates via the fourth refrigerant pipes and the first conduits connected to the fourth refrigerant pipes, flow along the hollow flow channels, and are discharged from the cooling plates via the second conduits and the fourth refrigerant pipes connected to the second conduits.

8. The cooling system according to claim 7, wherein the discharged second liquid streams are guided to the pipe connection members via the fourth refrigerant pipes connected to the second conduits and are combined with the first liquid streams flowing in the third refrigerant pipes connected to pipe connection members, and the combined liquid refrigerant is discharged through the refrigerant discharge port via the second refrigerant pipe.

9. The cooling system according to claim 1, wherein each of the cooling plates comprises:
a base plate having a plurality of protrusions formed thereon; and
a cover plate coupled to the base plate in a state of being in tight contact with the protrusions for defining a flow channel in a remaining space of the base plate excluding the protrusions.

10. The cooling system according to claim 9, wherein the protrusions comprise:
first protrusions discontinuously protruding from one end of the base plate toward the other end of the base plate; and
a second protrusion disposed between the first protrusions, the second protrusion continuously protruding from one end of the base plate toward the other end of the base plate, and wherein
a vortex is generated in the liquid refrigerant between the discontinuously protruding first protrusions, whereby a flow speed of the liquid refrigerant is increased.

11. The cooling system according to claim 9, wherein the base plate is provided on a surface thereof opposite a surface on which the protrusions are formed with an insulating material.

12. The cooling system according to claim 9, wherein the cover plate is provided on a surface thereof opposite a surface that faces the base plate with a thermal interface material pad for reducing thermal conduction resistance in a state of being in contact with a corresponding one of the battery modules.

13. The cooling system according to claim 9, wherein each of the cooling plates is configured such that a corresponding one of the battery modules is mounted on the cover plate and wherein each of the cooling plates receives heat from a corresponding one of the battery modules and transfers the heat to the liquid refrigerant flowing in the hollow flow channel, thereby cooling the battery module.

14. The cooling system according to claim 1, wherein
N−1 (N≥3) cooling plates are arranged side by side in a lateral direction to constitute a cooling plate array,
a first cooling plate is disposed in front of the cooling plates so as to correspond to a middle part of the cooling plate array, and
the refrigerant introduction port and the refrigerant discharge port are arranged side by side in front of the first cooling plate in a state in which the refrigerant introduction port and the refrigerant discharge port are connected to the first refrigerant pipe and the second refrigerant pipe, respectively.

15. A cooling system for cooling a plurality of battery modules, the cooling system comprising:
a refrigerant introduction port, through which liquid refrigerant is introduced, and a refrigerant discharge port, through which the liquid refrigerant is discharged;
a plurality of refrigerant pipes configured to communicate with the refrigerant introduction port or the refrigerant discharge port;
one or more pipe connection members configured to interconnect two or more of the refrigerant pipes such that the refrigerant pipes communicate with each other, the pipe connection members being configured to divide the liquid refrigerant or to change a flow direction of the liquid refrigerant between the connected refrigerant pipes; and
a plurality of cooling plates, each of which has a hollow flow channel communicating with at least one of the refrigerant pipes and each of which has one surface on which a corresponding one of the battery modules is mounted, the liquid refrigerant being circulated along the hollow flow channel, wherein
the liquid refrigerant is divided by the pipe connection members, the divided liquid refrigerant is supplied to the respective cooling plates, and the divided liquid refrigerant is combined after being discharged from the respective cooling plates, whereby the battery modules are cooled by the respective cooling plates as a result of thermal conduction of the divided liquid refrigerant,
the refrigerant pipes include:
a first refrigerant pipe connected to the refrigerant introduction port;
a second refrigerant pipe connected to the refrigerant discharge port;
a plurality of third refrigerant pipes disposed between the first refrigerant pipe and the second refrigerant pipe in a state of being connected to the respective pipe connection members such that the third refrigerant pipes communicate with the first refrigerant pipe and the second refrigerant pipe; and
a plurality of fourth refrigerant pipes connected to the third refrigerant pipes via the pipe connection members, the fourth refrigerant pipes being connected to the flow channels defined in the respective cooling plates such that the coolant only flows into and out of the cooling plates through the fourth refrigerant pipes N−1 (N≥3) cooling plates are arranged side by side in a lateral direction to constitute a cooling plate array, a first cooling plate is disposed in front of the cooling plates so as to correspond to a middle part of the cooling plate array, the refrigerant introduction port and the refrigerant discharge port are arranged side by side in front of the first cooling plate in a state in which the refrigerant introduction port and the refrigerant discharge port are connected to the first refrigerant pipe and the second refrigerant pipe, respectively, some of the third refrigerant pipes are arranged along opposite sides of the first cooling plate in a state of being connected to the first refrigerant pipe and the second refrigerant pipe via corresponding ones of the pipe connection members, and the other third refrigerant pipes are connected to the third refrigerant pipes arranged along the opposite sides of the first cooling plate via corresponding ones of the pipe connection members disposed between the first cooling plate and the cooling plate array.

16. The cooling system according to claim 15, wherein the fourth refrigerant pipes are further connected to the pipe connection members, and wherein the cooling plates communicate with the refrigerant introduction port or the refrigerant discharge port in a state of being connected to the fourth refrigerant pipes.

17. A battery pack comprising the cooling system according claim 1, the battery pack comprising:

a plurality of battery modules, each of which comprises a plurality of battery cells and which are mounted on the cooling plates of the cooling system in a state of being in tight contact with the cooling plates;

a bottom housing, on which the battery modules and the cooling system are mounted; and a top housing coupled to an outer edge of the bottom housing for isolating the battery modules and the cooling system from an outside, wherein at least one of the battery modules is different from the other battery modules in terms of a direction in which the batteries are arranged.

18. The battery pack according to claim 17, wherein the battery modules are classified into a first battery module assembly and a second battery module assembly, and wherein a direction in which battery cells belonging to the first battery module assembly are arranged is different from a direction in which battery cells belonging to the second battery module assembly are arranged.

19. The battery pack according to claim 18, wherein the first battery module assembly is mounted on the first cooling plate and/or the cooling plate located at the middle part of the cooling plate array, and the second battery module assembly is mounted on the other cooling plates of the cooling plate array.

20. The battery pack according to claim 4, wherein, when n is equal to or greater than 3, at least one of the connection conduits has an inner diameter equivalent to 5% to 99% of an inner diameter of each of the other connection conduits.

* * * * *